United States Patent
Oron et al.

(10) Patent No.: US 8,217,311 B2
(45) Date of Patent: Jul. 10, 2012

(54) METHOD FOR LASER INDUCED FUSION PIGTAILING OF OPTICAL FIBER TO OPTICAL WAVEGUIDE

(75) Inventors: Ram Oron, Nes-Ziona (IL); Ariela Donval, Rosh-Ha'ain (IL); Doron Nevo, Ra'anana (IL); Moshe Oron, Rehovot (IL)

(73) Assignee: KiloLambda Technologies Ltd., Tel Aviv (IL)

( * ) Notice: Subject to any disclaimer, the term of this patent is extended or adjusted under 35 U.S.C. 154(b) by 479 days.

(21) Appl. No.: 12/440,757

(22) PCT Filed: Sep. 7, 2007

(86) PCT No.: PCT/IB2007/002584
§ 371 (c)(1),
(2), (4) Date: Nov. 25, 2009

(87) PCT Pub. No.: WO2008/032165
PCT Pub. Date: Mar. 20, 2008

(65) Prior Publication Data
US 2010/0084383 A1    Apr. 8, 2010

(51) Int. Cl.
*G02B 6/255* (2006.01)
*H05B 7/18* (2006.01)
(52) U.S. Cl. ........ 219/383; 219/121.64; 385/96
(58) Field of Classification Search .......... 219/383, 219/384, 121.64; 385/96, 97, 98; 264/482, 264/484
See application file for complete search history.

(56) References Cited

U.S. PATENT DOCUMENTS

| | | | |
|---|---|---|---|
| 6,296,401 | B1 | 10/2001 | Paris |
| 6,360,039 | B1 | 3/2002 | Bernard et al. |
| 6,411,759 | B1 | 6/2002 | Beguin et al. |
| 6,414,262 | B1 | 7/2002 | Rao |
| 2002/0028390 | A1 | 3/2002 | Mazed |
| 2005/0117856 | A1 * | 6/2005 | Huang et al. ............ 385/96 |
| 2005/0147147 | A1 | 7/2005 | Umstadter et al. |
| 2005/0180695 | A1 | 8/2005 | Bronstein et al. |
| 2009/0274423 | A1 * | 11/2009 | Contag ............ 385/96 |

FOREIGN PATENT DOCUMENTS
JP    7-142190 A1 *  6/1995

OTHER PUBLICATIONS

PCT Search Report for International Application No. PCT/IB2007/002584 dated Sep. 29, 2008 (2 pages).
PCT Written Opinion for International Application No. PCT/IB2007/002584 dated Sep. 29, 2008 (4 pages).
"Local Fields Close to the Surface of Nanoparticles and Aggregates of Nanoparticles," by M. Quinten, Appl. Phys. B 73, 245-255 (2001).
"Absorption and Scattering of Light by Small Particles" by C.F. Bohren and D.R. Huffmann, Wiley-Interscience, Chapter 12 (1998).

* cited by examiner

*Primary Examiner* — Geoffrey S Evans
(74) *Attorney, Agent, or Firm* — Nixon Peabody LLP

(57) ABSTRACT

A method for instant splicing of an optical fiber to an optical waveguide or bulk material comprises forming a nanometric conductive layer at the interface between the optical fiber and the optical waveguide or bulk material to be spliced, and applying laser radiation to the interface through the fiber optical internally or through the bulk material externally, to produce an arc discharge due to the laser light electric field. The arc discharge melts and diffuses the conductive layer to produce a permanent splice having a low optical loss.

14 Claims, 3 Drawing Sheets

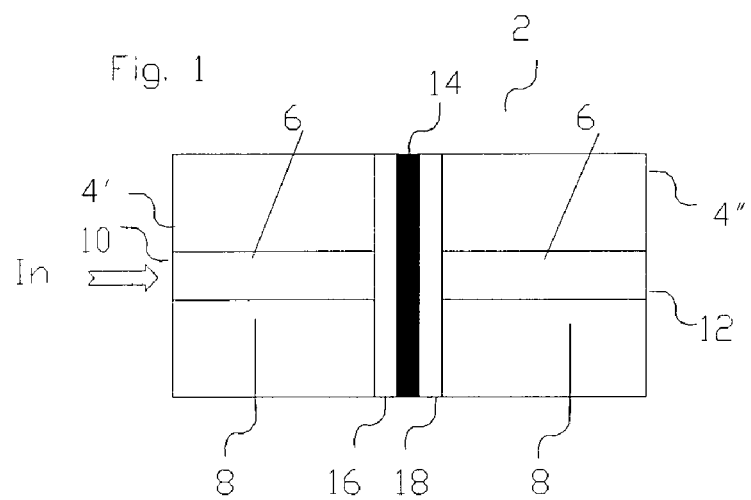
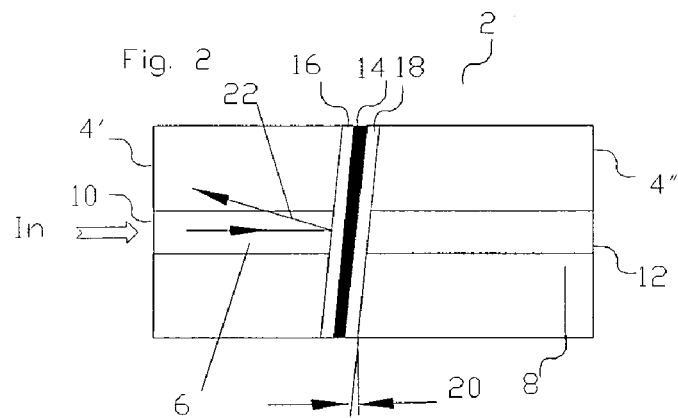
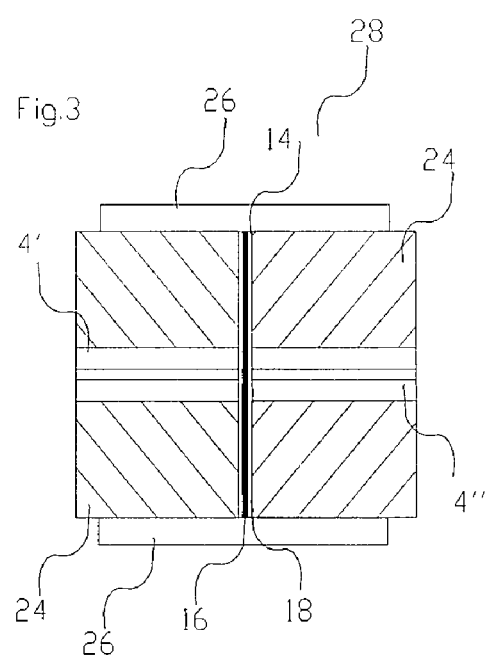

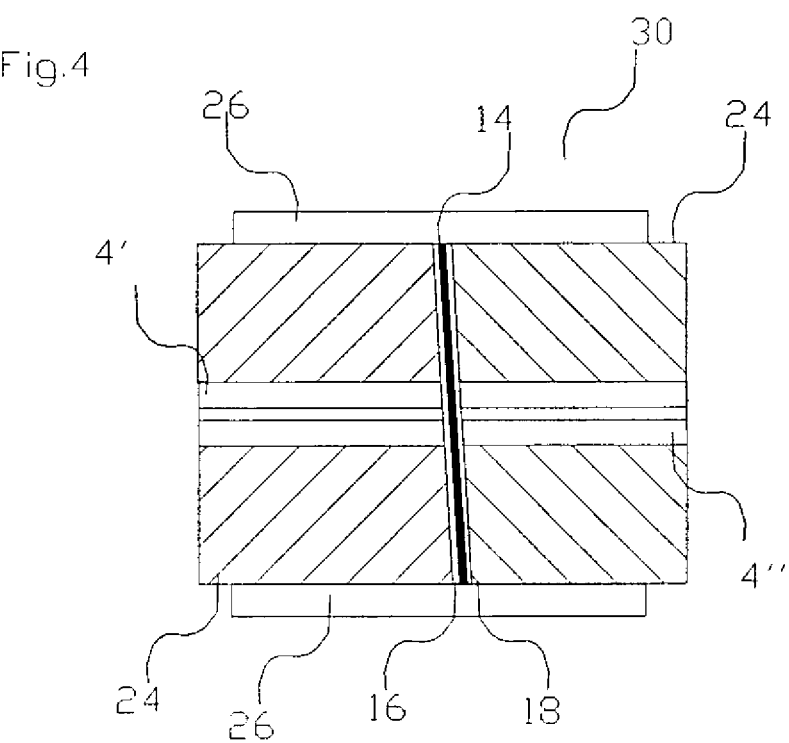
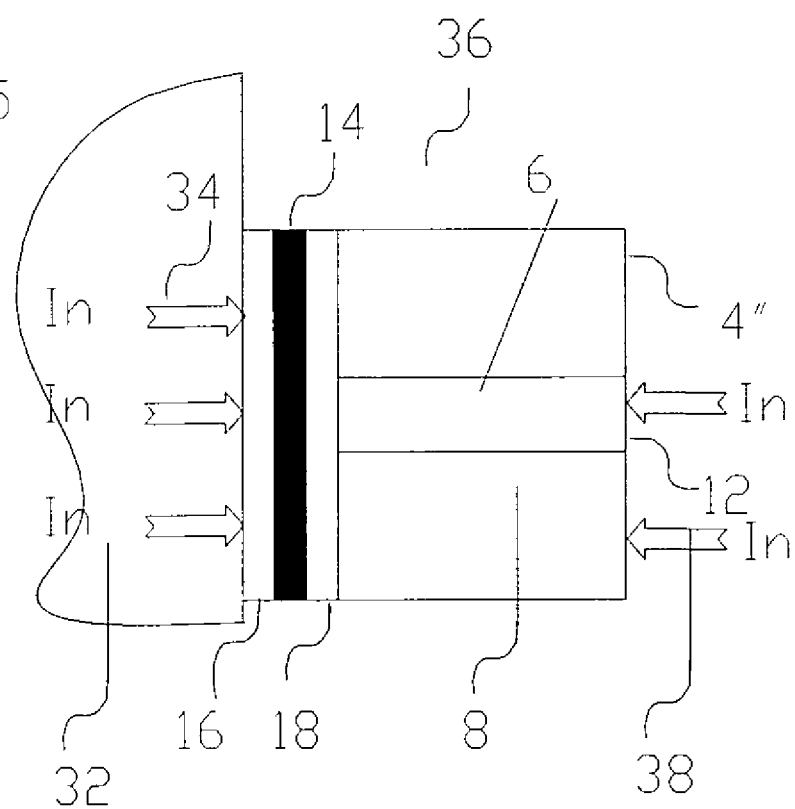

METHOD FOR LASER INDUCED FUSION PIGTAILING OF OPTICAL FIBER TO OPTICAL WAVEGUIDE

FIELD OF THE INVENTION

The present invention generally relates to the field of fiber optical communications, and more particularly to methods for joining optical fibers with integrated optical waveguides.

BACKGROUND OF THE INVENTION

Joining or splicing of optical fibers to optical fibers or optical waveguides on bulk material is of major importance in most fiber optics devices. The most common technology for fiber joining is fusion splicing, using an electrical arc short pulse for heating the two fiber ends while being spliced. This technology is applicable to fibers of equal diameters, but is not applicable for fiber to optical waveguides or bulk material attachment, since the bulk dimensions are much larger than the fiber and arc splicing cannot heat both the fiber and the optical waveguides or bulk material attachment equally and get an equal layer melted on both surfaces of the optical splice.

There are a number of known technologies for coupling or bonding a silica optical fiber to optical waveguides on bulk. Epoxy adhesive or simply epoxy is the predominant current bonding technology. The epoxy is introduced between the fiber and appropriate optical waveguides port and cured with the help of UV radiation. Epoxy serves not only as a bonding material; it enables some refractive index matching reducing transmission losses. Although simple, the method suffers of a number of shortcomings: Curing of the epoxy is not uniform; epoxy curing time is relatively long and the fiber frequently changes its position after alignment; epoxy out gassing adversely affects the hermetic photonic element packaging, and the optical transmission of the epoxy changes with the time. Since light passes through the epoxy, high power applications are prohibited. This procedure of splicing is a multi-step process, requiring a relatively long time. Some temporary splices use index-matching gel between the two surfaces, and need a permanent mechanical set up for aligning.

U.S. Pat. No. 6,296,401. to Paris and U.S. Pat. No. 6,411,759. to Beguin et al., disclose methods of optical fiber to waveguide connection by fusion. Paris shows a method for fusion pigtailing of an optical fiber to an integrated optical device with an optical device formed on a substrate. The substrate includes a groove under and behind an interface between the optical fiber and the optical device. Provision of such a groove allows the substrate to be used for alignment and support of the optical fiber, while reducing optical insertion loss and improving durability of the interface. Paris does not disclose the method according to which fiber fusion is performed.

Beguin shows a fusion joint between a waveguide and an optical fiber created by irradiating the interface between the optical fiber and the waveguide using a laser beam. The spatial distribution of the energy furnished to the interface presents a central zone of which the energy is reduced with respect to a peripheral zone, whereby to enable a relatively high-energy laser to be used while avoiding bending of the waveguide by high power laser heating. The laser beam is caused to irradiate a higher energy density upon the waveguide than the optical fiber, typically by offsetting the center of the laser beam towards the waveguide. The fusion is performed by the heat generated by the laser light absorption, while a force F urges the waveguide and optical fiber towards one another, to avoid the creation of a void at the boundary. Beguin irradiates a relatively large area that includes both the waveguide and the fiber. This causes some waste of laser energy, the heating process is not a homogenous one, the fusion process take excessive time and because of the waveguide heating requires additional annealing steps.

U.S. Pat. No. 6,360,039. to Bernard et al. discloses a method of joining at least two optical components. One of the optical components having a surface that has a comparatively larger cross-sectional area than the surface of the other optical component e.g. an optical fiber. The optical components are joined together by fusion-splicing, using a laser for heating. The fusion is achieved by melting a small area surrounding the joint with the fiber section on the larger than the optical fiber component by a process where the larger surface is first pre-heated by the laser. The pre-heat temperature is just sufficient to polish and melt the surface of the larger component at the location one desires to fuse the smaller component. The second surface is then brought into contact with the preheated surface and, once the thermal exchange is established (by conduction of heat), all components are heated simultaneously. This process requires a long time and needs customization for each geometry.

U.S. Pat. Application No. 20050180695. to Bronstein et al. discloses a method of joining a fiber and waveguide using a laser through the fiber, where the fiber is coated with laser absorbing glass powder or a special laser absorbing dye. Realization of this method is very problematic since the splice contains many laser absorbing centers, remnants of the initial absorbers, the splice has very high insertion loss and high reflections making it unfit for optical communication.

The need for an "instant" splicing, mainly of fibers to bulk materials or to waveguides in bulk material, calls for novel methods for attachment. This invention provides such a novel method.

SUMMARY OF THE INVENTION

It is a broad object of the present invention to provide an improved method for instant splicing of an optical fiber to optical waveguides or bulk material using laser radiation to create an electric breakdown or arc (similar to external arc splicing, but created only at selected locations) in a nanometric, electrically conductive layer, applied to one of the surfaces or to both surfaces to be spliced. The laser light can be applied to the interface through the fiber core and cladding internally or through the bulk material externally. The electrical arc, generated by the laser electric field, is confined to the interface covered by the nanometric conductive layer and to the laser spot dimensions.

It is a further object of the present invention to provide an improved method for instant splicing of fiber optics to optical waveguides or bulk material using laser radiation applied through the fiber core and cladding internally or through the bulk material externally, where a nanometric, electrically conductive layer, exposed to the laser light, is applied to one of the surfaces or to both surfaces, the layer consisting of a nanometric (few nanometers thick) layer of metal, e.g., cobalt, nickel, gold or other metal.

It is a further object of the present invention to provide an improved method for instant splicing of fiber optics to optical waveguides or bulk material using laser radiation applied through the fiber core and cladding internally or through the bulk material externally, where a nanometric, electrically conductive layer, exposed to the laser light, is applied to one of the surfaces or to both surfaces, and the laser is a high power CW laser, e.g., in the 1.5. micron region or in other regions that are transmitted by the fiber or the bulk material.

It is a further object of the present invention to provide an improved method for instant splicing of fiber optics to optical waveguides or bulk material using laser radiation applied through the fiber core and cladding internally, where a nanometric, electrically conductive layer, exposed to the laser light, is applied to one of the surfaces or to both surfaces to be spliced. The laser is a high power pulsed laser, e.g., in the 1.5. micron region or in other regions that are transmitted by the fiber.

It is a further object of the present invention to provide an improved method for instant splicing of fiber optics to optical waveguides or bulk material using laser radiation applied through the bulk material and heating the core and cladding area of the fiber, where a nanometric, electrically conductive layer, exposed to the laser light, is applied to one of the surfaces or to both surfaces to be spliced. The laser is a high power CW laser, e.g., in the 1.5 micron region or in other regions that are transmitted by the bulk material.

It is a further object of the present invention to provide an improved method for instant splicing of fiber optics to optical waveguides or bulk material using laser radiation applied through the bulk material and aimed at the core and cladding area of the fiber, where a nanometric, electrically conductive layer, exposed to the laser light, is applied to one of the surfaces or to both surfaces to be spliced. The laser is a high power pulsed laser, e.g., in the 1.5 micron region or in other spectral regions that are transmitted by the fiber.

It is a further object of the present invention to provide an improved method for instant splicing of fiber optics to optical waveguides or bulk material using laser radiation applied through the bulk material and aimed at the core and cladding area of the fiber, where a nanometric, electrically conductive layer, exposed to the laser light, is applied to one of the surfaces or to both surfaces to be spliced. The laser is a high power pulsed laser, e.g., in the 1.5 micron region or in other spectral regions that are transmitted by the bulk material.

According to an additional exemplary embodiment the objectives of the present invention may be achieved by a method of joining by laser fusion of an optical fiber to at least one port of a waveguide, comprising the steps of:

a. depositing a nano layer of conductive material on the tip of said optical fiber;

b. bringing in contact with said waveguide said tip of optical fiber having a nano layer of conductive material on it;

c. characterized in that said laser energy is delivered either along said optical fiber to said tip of the optical fiber or through the bulk material to said tip;

d. such that said tip of optical fiber becomes fused to said waveguide component by said laser induced arc at the interface and melting.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a schematic, cross-sectional view of fiber-to-fiber fusing, PC configuration, embodying the present invention.

FIG. 2 is a schematic, cross-sectional view of fiber-to-fiber fusing, APC configuration, embodying the present invention.

FIG. 3 is a schematic, cross-sectional view of fiber-to-fiber fusing, PC configuration in a ferrule and an aligning adaptor, embodying the present invention.

FIG. 4 is a schematic, cross-sectional view of fiber-to-fiber fusing, APC configuration in a ferrule and an aligning adaptor, embodying the present invention.

FIG. 5 is a schematic, cross-sectional view of fiber-to-bulk fusing, PC configuration, embodying the present invention.

FIG. 6 is a schematic flow chart of the process.

FIG. 7 is a picture of a splice.

DETAILED DESCRIPTION OF PREFERRED EMBODIMENTS

Figure 6:
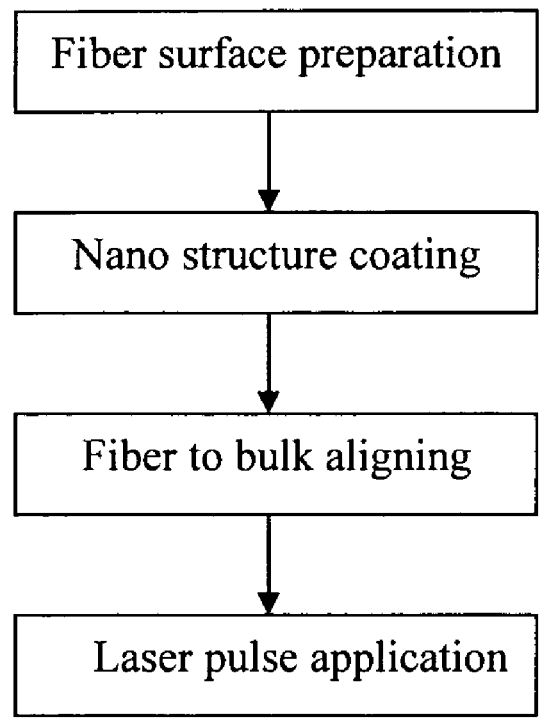

Referring now to FIG. 1, there is shown a laser fused splice 2, composed of an optical waveguide, e.g., a solid waveguide or a fiber, split transversely to form two waveguide sections 4' and 4". Each of the waveguide sections 4' and 4" is composed of a central core 6, in which most of the light propagates, and an outer cladding 8. Also, the waveguide section 4' has an input end 10 and the waveguide section 4" has an output end 12. Interposed between the two waveguide sections 4' and 4", and traversing the path of optical energy propagating in the core from the input end 10 to the output end 12, is a conducting layer 14. The layer 14 is very thin (only a few atomic layers, typically between about 1. and about 20. nanometers) and is made of a conducting material, preferably a metal such as rhodium, aluminum, gold, silver, chromium or nickel, or a combination or alloy of such metals.

Such thin layers of conducting material are known to enhance the electric field strength in their vicinity due to local irregularities of their surface, where the surface irregularities induce field concentration, resulting in lower power needed to create an electrical breakdown, arc discharge and melting. When the thin layer of conducting material is impinged with optical power exceeding a predetermined threshold, strong electric fields, which can lead to local electrical breakdown, are generated at certain sites ("hot spots") in proximity with the conductive surface. This leads to a visible-light-emitting arc discharge and material melting. The melting on both sides of the thin layer creates a permanent splice, where most of the thin layer is diffused away and the optical loss is very low.

Such thin nanometric layers may be modeled as a plurality of aggregates of nano-particles (see, e.g., M. Quinten, "Local Fields Close to the Surface of Nanoparticles and Aggregates of Nanoparticles," Appl. Phys. B 73, 245-255. (2001) and the book "Absorption and Scattering of Light by Small Particles" by C. F. Bohren and D. R. Huffmann, Wiley-Interscience (1998), Chapter 12 .[showing strong field enhancement factors (up to $10^5$) for few-nanometer particles as well as wide extinction spectra for various materials and shapes].

A low insertion loss at the operating powers is desirable, in order to avoid power losses. However, a conducting metallic layer generally absorbs and reflects some light. As discussed below, the reflection can be minimized by the addition of anti-reflective layers 16 and 18 on both sides of the conducting layer 14. The laser power for fusing is introduced in the core 6 or in the core 6 and cladding 8, which produces a larger surface of fused glass across the fiber.

As with most optical fiber components, minimal back reflection is desirable in the device of this invention. This minimal back reflection may be obtained by a combination of two methods. First, the conductive layer 14 can be deposited on a surface that extends across the optical waveguide at an acute angle, i.e., not perpendicular to the direction of propagation of the light, thus preventing any back reflection from re-entering the waveguide core, as depicted in FIG. 2. The metal layer may be either a single layer or a layer that is covered on one or on both sides with transparent layers, which can serve as anti-reflective coatings, reducing the optical reflections. The coating layers 16 and 18 are designed to have minimal reflections. The anti-reflective layers 16 and 18 can be composed of the same dielectric material, or of two different materials. Generally, when using the same material, in order to obtain minimal reflection, the thicknesses of the layers 16 and 18 are unequal; the difference in thicknesses of the entry layer 16 and the exit layer 18 is due to a phase change of reflections from conducting surfaces as opposed to no phase change of reflections from dielectric material like the silica of the fiber. The coating is then an asymmetric coating, and has a pre-designated input direction. Each of the anti-reflective coatings 16, 18 preferably has a thickness within the range from about 0.1. to about 1.5 micrometer.

FIG. 2 illustrates a device similar to that shown in FIG. 1. However, here the layers 14, 16 and 18 are not perpendicular to the direction of light propagation in the waveguide, but rather at an angle 20. For example, in single-mode optical fibers, e.g., SMF 28._1 , the angle 20 is typically 8. degrees. Thus, an optical reflection 22 from the layer 14 does not propagate backwards inside the waveguide but assumes direction 22 absorbed in the cladding 8.

FIG. 3 illustrates the welded fiber 28 similar to FIG. 1 packaged in an aligning sleeve 26 configuration and a ferrule 24 on each side. In this arrangement the fiber alignment prior to splicing by the laser is carried out by the aligning sleeve 26. The geometry is perpendicular. Interposed between the two waveguide sections 4' and 4", and traversing the path of optical energy propagating in the core from the input end 10 to the output end 12, is a conducting layer 14. The layer 14 is very thin (only a few atomic layers, typically 1. to 20 nanometers) and is preferably made of a metal such as rhodium, aluminum, gold, silver, chromium or nickel, or a combination or alloy of such metals.

FIG. 4 illustrates the splice of FIG. 3 packaged in a sleeve 26 and ferrules 24 configuration. Here, the two surfaces are at an angle and not perpendicular to the optical axis, called APC (Angled Physical Contact), for reflection reduction. All other parameters are similar to FIG. 3.

FIG. 5 illustrates a fiber to bulk material 32 splice, using a laser 34 through the bulk material or laser 38 through the fiber, for creation of the arc. The general process is similar to that described for FIG. 1.

FIG. 6 is a schematic flow chart of the process

Figure 7:
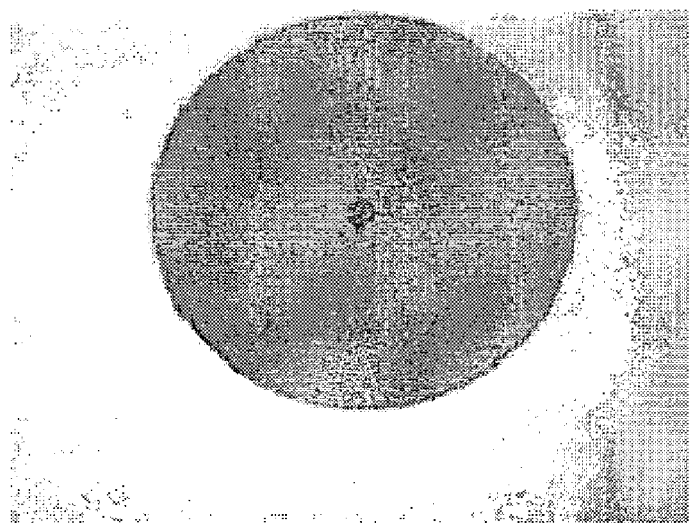

FIG. 7 is a microscope picture of a splice, having the following parameters: SMF 28. fiber, when spliced to another SMF 28. fiber using 2. watts, about 10. microsecond pulse, 1550. nm laser in the fiber core. The insertion loss is 1:3. dB at start and is lowered to about 0.8 dB after splicing.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes, which come within the meaning and range of equivalency of the claims, are therefore intended to be embraced therein.

What is claimed:

1. A method for instant splicing of an end surface of an optical fiber to an optical waveguide or bulk material, said optical fiber having a longitudinal axis, said method comprising
    forming a nanometric conductive layer of conductive nanoparticles at the interface between said end surface of said optical fiber and said optical waveguide or bulk material to be spliced, said conductive layer including surface irregularities, and
    applying laser radiation to said interface through said optical fiber internally along said longitudinal axis to produce an arc discharge at said interface due to the laser light electric field between said surface irregularities in said nanometric conductive layer.

2. The method of claim 1 in which said conductive layer is at least one metal selected from the group of rhodium, aluminum, gold, silver, chromium, nickel and alloys of said metals.

3. The method of claim 1 in which said conductive layer has a thickness between about 1 and about 20 nanometers.

4. The method of claim 1 in which said conductive layer is deposited on a surface that extends across the path of said laser radiation at an acute angle.

5. The method of claim 1 in which said laser radiation is produced by a high-bower CW laser.

6. The method of claim 1 which includes anti-reflective transparent layers on opposite sides of said conductive layer in the path of said laser radiation.

7. The method of claim 6 in which said anti-reflective transparent layers have different thicknesses.

8. A method for instant splicing of an end surface of an optical fiber to an optical waveguide or bulk material, said optical fiber having a longitudinal axis, said method comprising
    forming a nanometric conductive layer of conductive nanoparticles at the interface between said end surface of said optical fiber and said optical waveguide or bulk material to be spliced, said conductive layer including surface irregularities, and
    applying laser radiation to said interface through said optical waveguide or bulk material in a direction substantially parallel to the longitudinal axis of said optical fiber to produce an arc discharge at said interface due to the laser light electric field between said surface irregularities in said nanometric conductive layer.

9. The method of claim 8 in which said conductive layer is at least one metal selected from the group of rhodium, aluminum, gold, silver, chromium, nickel and alloys of said metals.

10. The method of claim 8 in which said conductive layer has a thickness between about 1 and about 20 nanometers.

11. The method of claim 8 in which said conductive layer is deposited on a surface that extends across the path of said laser radiation at an acute angle.

12. The method of claim 8 in which said laser radiation is produced by a high-power CW laser.

13. The method of claim 8 which includes anti-reflective transparent layers on opposite sides of said conductive layer in the path of said laser radiation.

14. The method of claim 13 in which said anti-reflective transparent layers have different thicknesses.

* * * * *

UNITED STATES PATENT AND TRADEMARK OFFICE
CERTIFICATE OF CORRECTION

| | | |
|---|---|---|
| PATENT NO. | : 8,217,311 B2 | Page 1 of 1 |
| APPLICATION NO. | : 12/440757 | |
| DATED | : July 10, 2012 | |
| INVENTOR(S) | : Ram Oron et al. | |

It is certified that error appears in the above-identified patent and that said Letters Patent is hereby corrected as shown below:

Title Page: Item 63 insert

--Related U.S. Application Data
  Provisional application No. 60/843,990, filed September 12, 2006--

Signed and Sealed this
Eleventh Day of September, 2012

David J. Kappos
*Director of the United States Patent and Trademark Office*